Oct. 7, 1958  V. A. COLANGELO  2,854,688
SHELL FISH OPENER
Filed Aug. 1, 1957
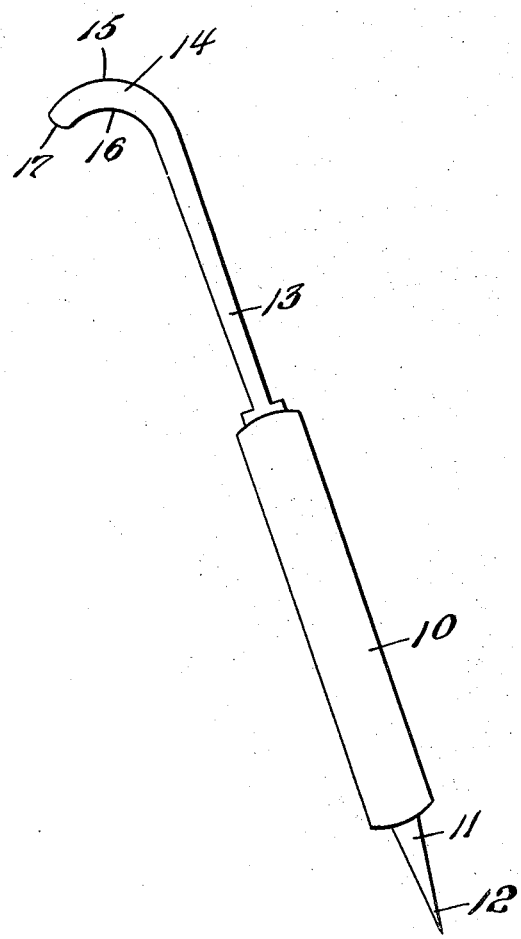
INVENTOR.
Virginia A. Colangelo
BY

United States Patent Office 2,854,688
Patented Oct. 7, 1958

2,854,688

SHELL FISH OPENER

Virginia A. Colangelo, Providence, R. I.

Application August 1, 1957, Serial No. 675,775

2 Claims. (Cl. 17—10)

This invention relates to a tool for opening shell fish, particularly clams, quahogs, and the like, although most any of the shell fish may be opened with this tool.

One of the objects of this invention is to provide an implement by use of which the manipulator may pierce a hole in the shell fish at a weak point and then insert a cutter for cutting the muscles which hold the two shells of the shell fish together.

Another object of the invention is to provide an implement by which the shell fish may be opened without destroying either of the shells.

Another object of the invention is to provide a tool which will be of simple construction yet thoroughly practical and efficient in use.

With these and other objects in view, the invention consists of certain novel features of construction as will be more fully described and particularly pointed out in the appended claims.

In the accompanying drawing, the figure is a plan view of the implement.

In proceeding with this invention, I provide a tool which will have a punch having a stiff shank or stem with a sharp point which may be forced into the shell fish near the hinge connection between the two shells, this punch projecting from one end of a handle. On the other end of the handle, there projects a bladelike tool which is arcuate at its free end and sharpened along opposite edges which may be positioned through the hole made by the punch, the shank being of sufficient extent so that the sharpened arcuate end may reach in and sever the muscles which hold the two shells of the shell fish together.

With reference to the drawings, 10 designates the handle which may be of any convenient shape which will be comfortable to the hand. From one end of this handle, there projects a punch having a stem 11 which is rather stiff and has its end sharpened into a point. From the other end of the handle, there projects a shank 13 of considerably longer extent and which is arcuate as at 14 at its free end. This arcuate portion is wider than the shank and is sharpened along both edges as at 15 and 16. These sharpened edges are smooth along their concave and convex edges as distinguished from being scalloped or saw toothed. The material used will be of some corrosion resistant material such, for instance, as stainless steel which may have the edges sharpened or some high carbon cutlery steel may be used so as to maintain the edges sharp for an extended length of time.

In operation the shell fish such as the quahog is held in the hand with the hinged portion of this shell fish uppermost. Along the hinge, there is a weak portion and at this location, I will insert the sharp point 12 of the punch 11, which is easily inserted at this location. This punch is of a sufficient diameter to make a hole sufficient so that the squared end 17 may be inserted and the muscles on either side of the hinge connection between the shells may be severed by either edge of the instrument which is most handy for manipulation. With these muscles severed it is a simple matter to separate the shells moving them one from the other, and, if desired, the arcuate portion of the instrument may be used for assisting in removing the meat from the shells for further use.

I claim:

1. A shell fish opener comprising a substantially straight elongated shank having a free end of arcuate shape sharpened along its opposite concave and convex edges for insertion between the opposite shells for severing the muscles thereof, said free end being wider than said shank and a handle fixed to said shank at its opposite end.

2. A shell fish opening as in claim 1 wherein a sharp pointed punch extends from the other end of the handle and is co-axial therewith.

References Cited in the file of this patent

UNITED STATES PATENTS

| | | |
|---|---|---|
| 10,798 | Blake | Apr. 18, 1854 |
| 69,388 | Barney | Oct. 1, 1867 |
| 162,606 | Berger | Apr. 27, 1875 |
| 411,381 | Huppmann | Sept. 17, 1889 |
| 718,847 | Kelley | Jan. 20, 1903 |
| 1,466,753 | Raubert | Sept. 4, 1923 |